US012563484B2

(12) United States Patent
Zhu

(10) Patent No.: US 12,563,484 B2
(45) Date of Patent: Feb. 24, 2026

(54) ROAMING NETWORK SELECTION METHOD, SYSTEM, ELECTRONIC DEVICE AND STORAGE MEDIUM

(71) Applicant: SPREADTRUM SEMICONDUCTOR (NANJING) CO., LTD., Jiangsu (CN)

(72) Inventor: Chunhui Zhu, Jiangsu (CN)

(73) Assignee: SPREADTRUM SEMICONDUCTOR (NANJING) CO., LTD., Jiangsu (CN)

( * ) Notice: Subject to any disclaimer, the term of this patent is extended or adjusted under 35 U.S.C. 154(b) by 439 days.

(21) Appl. No.: 18/258,898

(22) PCT Filed: Dec. 8, 2021

(86) PCT No.: PCT/CN2021/136251
§ 371 (c)(1),
(2) Date: Jun. 22, 2023

(87) PCT Pub. No.: WO2022/135142
PCT Pub. Date: Jun. 30, 2022

(65) Prior Publication Data
US 2024/0049123 A1     Feb. 8, 2024

(30) Foreign Application Priority Data
Dec. 22, 2020     (CN) ......................... 202011529858.9

(51) Int. Cl.
*H04W 48/18*       (2009.01)
*H04W 4/90*        (2018.01)
(Continued)

(52) U.S. Cl.
CPC ............. *H04W 48/18* (2013.01); *H04W 4/90* (2018.02); *H04W 8/082* (2013.01); *H04W 84/042* (2013.01)

(58) Field of Classification Search
CPC ....... H04W 48/18; H04W 4/90; H04W 8/082; H04W 84/042; H04W 36/14
See application file for complete search history.

(56) References Cited

U.S. PATENT DOCUMENTS

2015/0351023 A1    12/2015  Basavaraj et al.
2021/0258869 A1*    8/2021  Di Girolamo ........ H04W 48/10
(Continued)

FOREIGN PATENT DOCUMENTS

CN          101257429 A      9/2008
CN          103369553 A     10/2013
(Continued)

OTHER PUBLICATIONS

Jun. 29, 2024 Second Office Action issued in China Patent Application No. CN202011529858.9, English translation attached.
(Continued)

*Primary Examiner* — Wayne H Cai
(74) *Attorney, Agent, or Firm* — MH2 Technology Law Group LLP

(57) ABSTRACT
The present invention provides a roaming network selection method, a system, an electronic device and a storage medium, which are applicable to a terminal in a connected state at a roaming place. Said method includes receiving steering of roaming information containing a PLMN list and a timer issued by a network side device; determining whether a current service is an emergency service; starting the timer when the current service is a non-emergency service, and outputting notification information, so as to notify that network switching is to be performed after the timer expires; and performing network selection according to the PLMN list after the timer expires when no switching rejection instruction in response to the notification information is received. The present invention enables UE in a connected state at a roaming place to access a VPLMN with (Continued)

a higher priority, without affecting the running high-priority service.

20 Claims, 3 Drawing Sheets

(51) Int. Cl.
H04W 8/08 (2009.01)
H04W 84/04 (2009.01)

(56) References Cited

U.S. PATENT DOCUMENTS

| | | | |
|---|---|---|---|
| 2021/0289341 A1 | 9/2021 | Hans | |
| 2022/0095212 A1* | 3/2022 | Takeda ................. | H04W 48/18 |

FOREIGN PATENT DOCUMENTS

| | | |
|---|---|---|
| CN | 106031232 A | 10/2016 |
| CN | 110089155 A | 8/2019 |
| CN | 110945886 A | 3/2020 |
| CN | 112042214 A | 12/2020 |
| EP | 1968283 A1 | 9/2008 |
| EP | 3681204 A1 | 7/2020 |
| WO | 2013137629 A1 | 9/2013 |
| WO | 2019165406 A1 | 8/2019 |
| WO | 2020186092 A2 | 9/2020 |

OTHER PUBLICATIONS

Feb. 25, 2022 Written Opinion issued in Chinese Patent Application No. PCT/CN20211/36251, English translation attached.
Feb. 28, 2024 First Office Action issued in Chinese Patent Application No. CN202011529858.9.
Feb. 21, 2024 Search Report issued in Chinese Patent Application No. CN202011529858.9.
Nov. 25, 2024 Rejection issued in Chinese Patent Application No. CN202011529858.9.
Oct. 23, 2024 Extended European Search Report issued in European Patent Application No. EP21909139.4.
International Search Report dated Feb. 25, 2022, PCT Application No. PCT/CN2021/136251, 9 pages (including English translation).

* cited by examiner

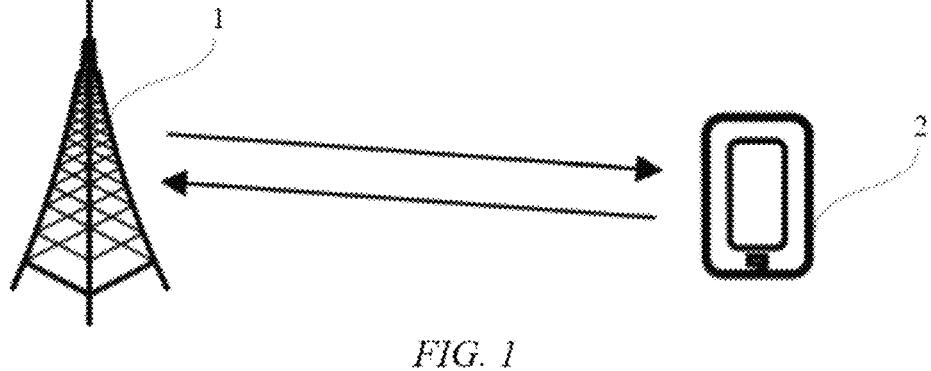

*FIG. 1*

| |
|---|
| Set a timing duration of a timer |

S11

| |
|---|
| Issue steering of roaming information to a terminal, the steering of roaming information containing a PLMN list and the timer, so that when a current service is a non-emergency service, the terminal starts the timer, and outputs notification information at the same time, so as to notify that network switching is to be performed after the timer expires, and when no switching rejection instruction in response to the notification information is received, the terminal performs network selection according to the PLMN list after the timer expires |

ROAMING NETWORK SELECTION METHOD, SYSTEM, ELECTRONIC DEVICE AND STORAGE MEDIUM

CROSS-REFERENCE TO RELATED APPLICATIONS

The present application is a national phase entry of PCT/CN2021/136251 filed on Dec. 8, 2023, which claims priority to Chinese patent application No. 2020115298589, filed Dec. 22, 2020, the disclosures of all of which are incorporated herein by reference in their entirety.

TECHNICAL FIELD

The present disclosure relates to the field of communication technologies, and in particular, to a method and system for selecting a roaming network, an electronic device, and a storage medium.

BACKGROUND

The mobile communication system provides users with roaming capabilities, so that users can implement communication in different places and different cellular network cells. In roaming scenarios, user equipment (UE) generally performs automatic public land mobile network (PLMN) selection only in an idle state, so as to select an operator based on a priority. When the UE is in a connected state, generally, there is a service being executed on the UE, for example, the UE is currently engaged in a phone call or Internet activity. At this time, PLMN reselection is generally not performed, because it may cause service interruption and affect user experience.

In this regard, some operators have proposed that the UE in the connected state can also be guided to a higher-priority VPLMN (visited PLMN) without affecting a high-priority service being executed on the UE, so as to ensure user experience.

SUMMARY OF THE INVENTION

An objective of the present disclosure is to provide a method and system for selecting a roaming network, an electronic device, and a storage medium, such that UE in a connected state in a roaming place can access a VPLMN with a higher priority without affecting a high-priority service being executed, so as to ensure user experience.

To achieve the above objective, the present disclosure provides a method for selecting a roaming network, the method being applicable to a network side device, including:

setting a timing duration of a timer; and issuing steering of roaming information to a terminal, the steering of roaming information containing a PLMN list and the timer, so that when a current service is a non-emergency service, the terminal starts the timer, and outputs notification information at the same time, so as to notify that network switching is to be performed after the timer expires, and when no switching rejection instruction in response to the notification information is received, the terminal performs network selection according to the PLMN list after the timer expires.

In one preferred embodiment of the present disclosure, the setting a timing duration of a timer includes:

obtaining the current service of the terminal;

obtaining a historical duration of the terminal performing the current service; and setting the timing duration based on the historical duration of the terminal performing the current service.

To achieve the above objective, the present disclosure further provides a method for selecting a roaming network, the method being applicable to a terminal in a connected state in a roaming place, including:

receiving the steering of roaming information issued by the network side device;

determining whether the current service is an emergency service;

starting the timer when the current service is a non-emergency service, and outputting notification information, so as to notify that network switching is to be performed after the timer expires; and when no switching rejection instruction in response to the notification information is received, performing network selection according to the PLMN list after the timer expires.

In one preferred embodiment of the present disclosure, the method further includes: when the switching rejection instruction in response to the notification information is received, performing network selection according to the PLMN list after the current service ends.

In one preferred embodiment of the present disclosure, the method further includes: when the current service is an emergency service, performing network selection according to the PLMN list after the current service ends.

In one preferred embodiment of the present disclosure, the performing network selection according to the PLMN list includes:

selecting a VPLMN with a highest priority from the PLMN list.

To achieve the above objective, the present disclosure further provides a system for selecting a roaming network, the system being applicable to a network side device, including:

a timer setting module configured to set a timing duration of a timer; and a steering of roaming information sending module configured to issue steering of roaming information to a terminal, the steering of roaming information containing a PLMN list and the timer, so that when a current service is a non-emergency service, the terminal starts the timer, and outputs notification information at the same time, so as to notify that network switching is to be performed after the timer expires, and when no switching rejection instruction in response to the notification information is received, the terminal performs network selection according to the PLMN list after the timer expires.

In one preferred embodiment of the present disclosure, the timer setting module is specifically configured to:

obtain the current service of the terminal;

obtain a historical duration of the terminal performing the current service; and set the timing duration based on the historical duration of the terminal performing the current service.

To achieve the above objective, the present disclosure further provides a system for selecting a roaming network, the system being applicable to a terminal in a connected state in a roaming place, including:

a receiving module configured to receive the steering of roaming information issued by the network side device, the steering of roaming information containing a PLMN list and the timer;

a determining module configured to determine whether the current service is an emergency service;

a timing module configured to: start the timer when the current service is a non-emergency service, and output notification information, so as to notify that network switching is to be performed after the timer expires; and a network selection module configured to: perform network selection according to the PLMN list after the timer expires when no switching rejection instruction in response to the notification information is received.

In one preferred embodiment of the present disclosure, the network selection module is further configured to: perform network selection according to the PLMN list after the current service ends when a switching rejection instruction in response to the notification information is received.

In one preferred embodiment of the present disclosure, the network selection module is further configured to: perform network selection according to the PLMN list after the current service ends when the current service is an emergency service.

In one preferred embodiment of the present disclosure, the performing, by the network selection module, network selection according to the PLMN list includes:

selecting a VPLMN with a highest priority from the PLMN list.

To achieve the above objective, the present disclosure further provides an electronic device, including: a memory, a processor, and a computer program stored on the memory and executable on the processor, where the computer program, when executed by the processor, implements the steps of the method as described above.

To achieve the above objective, the present disclosure further provides a computer-readable storage medium having a computer program stored thereon, where the computer program, when executed by a processor, implements the steps of the method as described above.

With the above technical solutions, the present disclosure has the following beneficial effects:

The present disclosure adds the timer to the steering of roaming information issued by the network side device, when receiving the steering of roaming information, the terminal in the connected state in the roaming place first determines whether the current service is an emergency service, and if the current service is a non-emergency service, the terminal starts the timer, and outputs the notification information that network switching is to be performed after the timer expires; and when no switching rejection instruction in response to the notification information is received, it indicates that the current service is neither an emergency service nor a high-priority task as perceived by a user, and the terminal performs network selection according to the PLMN list after the timer expires. Therefore, the UE in the connected state in the roaming place can access a VPLMN with a higher priority without affecting a high-priority service being executed, so as to ensure user experience.

BRIEF DESCRIPTION OF THE DRAWINGS

FIG. 1 is a diagram of an architecture of a mobile communication system based on the present disclosure;

FIG. 2 is a flowchart of a method for selecting a roaming network according to Embodiment 1 of the present disclosure;

DETAILED DESCRIPTION

Figures 3, 4:
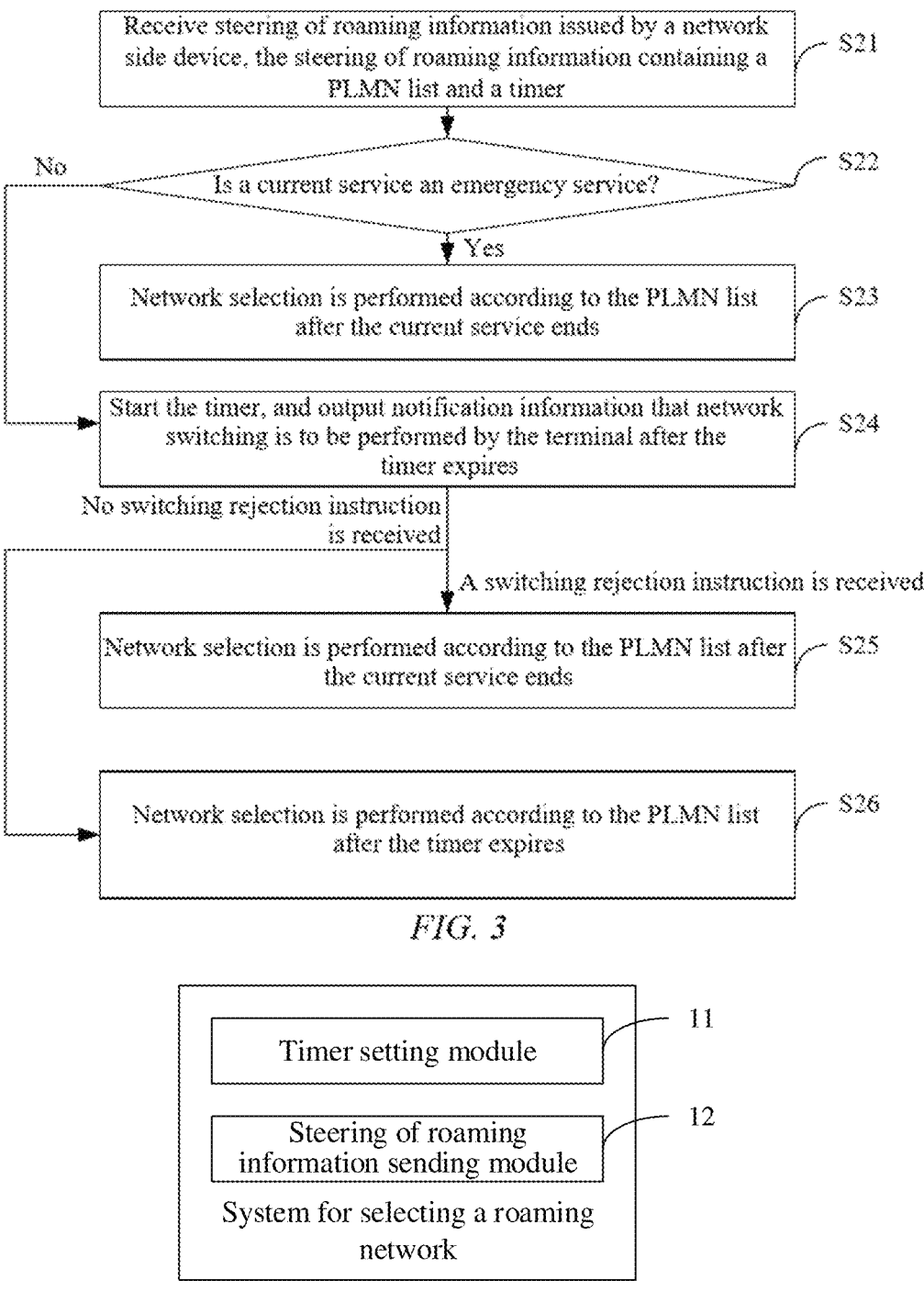
FIG. 3 is a flowchart of a method for selecting a roaming network according to Embodiment 2 of the present disclosure.
FIG. 4 is a block diagram of a structure of a system for selecting a roaming network according to Embodiment 3 of the present disclosure.

In order to make the purposes, technical solutions and advantages of the present disclosure clearer, the present disclosure is further illustrated in detail below in conjunction with the accompanying drawings and embodiments. It is to be understood that the specific embodiments described herein are merely illustrative of the present disclosure and are not intended to limit the present disclosure. On the basis of the embodiments of the present disclosure, all other embodiments obtained by those of ordinary skill in the art without involving any inventive effort fall within the scope of protection of the present disclosure.

It should be noted that the terms used in the present disclosure are merely for the purpose of describing specific embodiments, and are not intended to limit the present disclosure. The terms "a/an", "said" and "the" in the singular form used in the present disclosure and the appended claims are also intended to include the plural form unless otherwise clearly indicated in the context.

FIG. 1 is a schematic diagram of a structure of a mobile communication system the present disclosure is based on; the mobile communication system may be an LTE system, or a 5G system. The 5G system is also referred to as a New Radio (NR) system, and may be a 5G next-generation mobile communication technology system or another communication system, which is not limited in the embodiments.

As shown in FIG. 1, the mobile communication system includes a network side device 1 and a terminal 2.

The network side device 1 may be a base station (BS), or may be referred to as a base station device, and is an apparatus deployed in a radio access network (RAN) to provide a wireless communication function. A specific implementation of the network side device 1 is not limited in the present disclosure. The network side device 1 may also include a Home eNodeB (HeNB), a relay, a picocell base station, etc., and may further include a device that provides base station functions in future new communication systems, which is not specifically limited in the present disclosure.

The terminal 2 refers to a device that performs data communication with the network side device 1. The terminal may communicate with one or more core networks through the radio access network. The terminal 2 may be any form of user equipment (UE), access terminal device, subscriber unit, subscriber station, mobile station (MS), mobile console, remote station, remote terminal device, mobile device, user terminal device, wireless communication device, or user agent or user apparatus. These are merely examples, and those skilled in the art can reasonably infer, according to the content disclosed in the description, that other related products are also applicable. The terminal 2 may receive downlink data sent by the network side device 1 through a wireless connection with the network side device 1.

It should be noted that, the mobile communication system shown in FIG. 1 may include a plurality of network side devices 1 and/or a plurality of terminals 2. One network side device 1 and one terminal 2 are shown in FIG. 1 as examples, but the present disclosure does not make any limitation thereto.

Embodiment 1

Based on the mobile communication system shown in FIG. 1, an embodiment provides a method for selecting a roaming network, the method being applicable to a network side device 1. As shown in FIG. 2, the method specifically includes the following steps:

S11: setting a timing duration of a timer; and

S12: issuing steering of roaming information to a terminal, the steering of roaming information containing a PLMN list and the timer, so that when a current service is a non-emergency service, the terminal starts the timer, and outputs notification information at the same time, so as to notify that network switching is to be performed after the timer expires, and when no switching rejection instruction in response to the notification information is received, the terminal performs network selection according to the PLMN list after the timer expires.

It should be understood that, when the terminal leaves a geographical area covered by an HPLMN (home PLMN), the HPLMN can find a VPLMN (visited PLMN) in an area where the terminal is currently located, and the HPLMN network sends the steering of roaming (SoR) information carrying the PLMN list to the terminal to guide the terminal to access a VPLMN with a highest priority. The PLMN list includes a plurality of VPLMNs to be selected and a priority corresponding to each VPLMN.

In addition to the PLMN list, the timer is added to the issued steering of roaming information in this embodiment. The timing duration of the timer may be set through the following steps:

In S111, the current service of the terminal is obtained. For example, the current service being executed by the terminal is a voice service, or an XX game service.

In addition, the timing duration of the timer may alternatively be configured based on a type of the current service and historical data of the terminal executing the current service type. For example, when the current service of the terminal is game X, and an average historical duration of the terminal executing the game is C minutes, the duration of the timer may be set to C minutes.

In S112, a historical duration of the terminal performing the current service is obtained.

For example, assuming that the current service is an XX game service, a historical duration of the terminal executing the XX game service within a predetermined time period (for example, the past three months) is obtained.

In S113, the timing duration is set, according to a predetermined timing strategy, based on the historical duration of the terminal performing the current service.

For example, the timing duration may be set based on an average value of the historical duration of the terminal performing the current service. Alternatively, the timing duration may be set based on a median of the historical duration of the terminal performing the current service. Alternatively, the timing duration may be set based on a maximum value of the historical duration of the terminal performing the current service. Certainly, the above is merely an example, and this embodiment does not impose any limitation on the timing strategy, and any appropriate strategy can be selected according to specific requirements.

Through the above solution, the UE in the connected state in the roaming place can access a VPLMN with a higher priority without affecting a high-priority service being executed, so as to ensure user experience.

In addition, in this embodiment, the timing duration is set based on the historical duration of the terminal performing the current service, which can better meet personalized requirements of different terminals under different services, compared to setting a fixed timing duration for different current services of different terminals.

Embodiment 2

Based on the mobile communication system shown in FIG. 1, an embodiment provides a method for selecting a roaming network, the method being applicable to a terminal 2 in a connected state in a roaming place. As shown in FIG. 3, the method specifically includes the following steps.

In S21, the steering of roaming information issued by the network side device is received, the steering of roaming information containing a PLMN list and the timer.

It should be understood that, when the terminal leaves a geographical area covered by an HPLMN (home PLMN), the HPLMN can find a VPLMN (visited PLMN) in an area where the terminal is currently located, and the HPLMN network sends the steering of roaming (SoR) information carrying the PLMN list to the terminal to guide the terminal to access a VPLMN with the highest priority. The PLMN list includes a plurality of VPLMNs to be selected and a priority corresponding to each VPLMN.

In addition to the PLMN list, the timer is added to the received steering of roaming information in this embodiment.

In S22, whether the current service is an emergency service is determined, and if yes, step S23 is performed, or if no, step S24 is performed.

It should be understood that the emergency service is a service with the highest priority. In this embodiment, whether the current service being executed by the terminal is an emergency service may be determined according to a preset determining rule. For example, if the current service is an emergency call service, it is determined as an emergency service. If the current service is an ordinary call service, it is determined as a non-emergency service. If the current service is an X-type game service, it is determined as an emergency service. If the current service is a Y-type game service, it is determined as a non-emergency service. The determining rule in this embodiment may be configured in a personalized manner according to user requirements.

In S23, when the current service is an emergency service, network selection is performed according to the PLMN list after the current service ends.

For example, when the current service is an emergency call service, waiting for the emergency call to be hung up is required. After the emergency call is hung up, network selection is performed according to the received PLMN list, that is, the VPLMN with the highest priority is selected from the PLMN list for access. Therefore, it is avoided that the network switching causes the terminal to be interrupted during execution of the emergency service, which affects the user experience.

In S24, when the current service is a non-emergency service, the timer is started, and notification information that network switching is to be performed after the timer expires is outputted.

For example, when the current service is determined as a non-emergency service, the timer is started, and the notification information "You are to be switched to VPLMN X in x minutes/hours." is displayed on a screen of the terminal, where "x minutes/hours" is the timing duration of the timer, and "VPLMN X" is a VPLMN with the highest priority in the PLMN list.

In S25, when the switching rejection instruction in response to the notification information is received, network selection is performed according to the PLMN list after the current service ends.

For example, it is assumed in this embodiment that "OK" and "Cancel" control buttons are configured on an interface for the notification information "You are to be switched to VPLMN X in x minutes/hours.", and if the user taps on the "Cancel" control button, it indicates that the user has entered the switching rejection instruction, the timer is set to expire, waiting for the current service to be ended is required, and the VPLMN with the highest priority is selected from the PLMN list for access after the current service ends. In this way, it is avoided that the network switching causes a task perceived by the user as high-priority to be interrupted, which affects the user experience.

In S26, when no switching rejection instruction in response to the notification information is received, network selection is performed according to the PLMN list after the timer expires.

For example, it is assumed in this embodiment that "OK" and "Cancel" control buttons are configured on an interface for the notification information "You are to be switched to VPLMN X in x minutes/hours.", and if the user taps on the "OK" control button, or because the user does not notice/ignores the notification information, that is, the user does not tap on the "OK" or the "Cancel" control button, it is considered that no switching rejection instruction in response to the notification information is received. In this case, it indicates that the current service is not an emergency service, that is, the current service is not a high-priority task as perceived by the user, and after the timer expires, the VPLMN with the highest priority can be selected from the PLMN list for access.

Through the above solution, the UE in the connected state in the roaming place can access a VPLMN with a higher priority without affecting a high-priority service being executed, so as to ensure user experience.

Embodiment 3

Based on the mobile communication system shown in FIG. 1, an embodiment provides a system for selecting a roaming network, the system being applicable to a network side device 1. As shown in FIG. 4, the system specifically includes:

a timer setting module 11 configured to set a timing duration of a timer; and a steering of roaming information sending module 12 configured to issue steering of roaming information to a terminal, the steering of roaming information containing a PLMN list and the timer, so that when a current service is a non-emergency service, the terminal starts the timer, and outputs notification information at the same time, so as to notify that network switching is to be performed after the timer expires, and when no switching rejection instruction in response to the notification information is received, the terminal performs network selection according to the PLMN list after the timer expires.

It should be understood that, when the terminal leaves a geographical area covered by an HPLMN (home PLMN), the HPLMN can find a VPLMN (visited PLMN) in an area where the terminal is currently located, and the HPLMN network sends the steering of roaming (SoR) information carrying the PLMN list to the terminal to guide the terminal to access a VPLMN with the highest priority. The PLMN list includes a plurality of VPLMNs to be selected and a priority corresponding to each VPLMN.

In addition to the PLMN list, the timer is added to the issued steering of roaming information in this embodiment, and the timing duration of the timer is set in advance by using the timer setting module 11, where the timer setting module 11 sets the timing duration through the following specific steps:

First, the current service of the terminal is obtained. For example, the current service being executed by the terminal is a voice service, or an XX game service.

In addition, the timing duration of the timer may alternatively be configured based on a type of the current service and historical data of the terminal executing the current service type. For example, when the current service of the terminal is game X, and an average historical duration of the terminal executing the game is C minutes, the duration of the timer may be set to C minutes.

Then, a historical duration of the terminal performing the current service is obtained.

For example, assuming that the current service is an XX game service, a historical duration of the terminal executing the XX game service within a predetermined time period (for example, the past three months) is obtained.

Finally, the timing duration is set, according to a predetermined timing strategy, based on the historical duration of the terminal performing the current service.

For example, the timing duration may be set based on an average value of the historical duration of the terminal performing the current service. Alternatively, the timing duration may be set based on a median of the historical duration of the terminal performing the current service. Alternatively, the timing duration may be set based on a maximum value of the historical duration of the terminal performing the current service. Certainly, the above is merely an example, and this embodiment does not impose any limitation on the timing strategy, and any appropriate strategy can be selected according to specific requirements.

Through the above solution, the UE in the connected state in the roaming place can access a VPLMN with a higher priority without affecting a high-priority service being executed, so as to ensure user experience.

In addition, in this embodiment, the timing duration is set based on the historical duration of the terminal performing the current service, which can better meet personalized requirements of different terminals under different services, compared to setting a fixed timing duration for different current services of different terminals.

Embodiment 4

Figure 5:
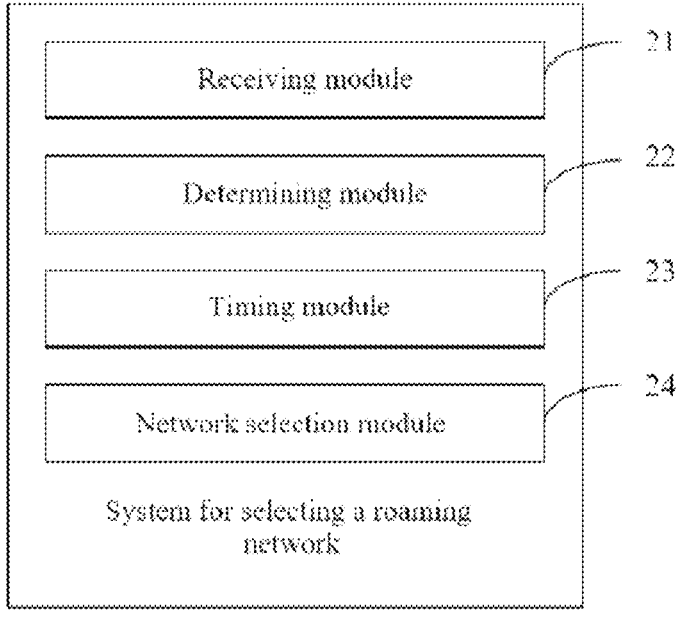
FIG. 5 is a block diagram of a structure of a system for selecting a roaming network according to Embodiment 4 of the present disclosure.

Based on the mobile communication system shown in FIG. 1, an embodiment provides a system for selecting a roaming network, the system being applicable to a terminal 2 in a connected state in a roaming place. As shown in FIG. 5, the system specifically includes: a receiving module 21, a determining module 22, a timing module 23, and a network selection module 24. The modules are described in detail below.

The receiving module 21 is configured to receive the steering of roaming information issued by the network side device, the steering of roaming information containing a PLMN list and the timer.

It should be understood that, when the terminal leaves a geographical area covered by an HPLMN (home PLMN), the HPLMN can find a VPLMN (visited PLMN) in an area where the terminal is currently located, and the HPLMN network sends the steering of roaming (SoR) information carrying the PLMN list to the terminal to guide the terminal to access a VPLMN with the highest priority. The PLMN list includes a plurality of VPLMNs to be selected and a priority corresponding to each VPLMN.

In addition to the PLMN list, the timer is added to the received steering of roaming information in this embodiment.

The determining module 22 is configured to determine whether the current service is an emergency service.

It should be understood that the emergency service is a service with the highest priority. In this embodiment, whether the current service being executed by the terminal is an emergency service is determined according to a preset determining rule. For example, if the current service is an emergency call service, it is determined as an emergency service. If the current service is an ordinary call service, it is determined as a non-emergency service. If the current service is an X-type game service, it is determined as an emergency service. If the current service is a Y-type game service, it is determined as a non-emergency service. The determining rule in this embodiment may be configured in a personalized manner according to user requirements.

The timing module 23 is configured to: start the timer when the current service is a non-emergency service and output notification information that network switching is to be performed after the timer expires.

For example, when the current service is determined as a non-emergency service, the timer is started, and the notification information "You are to be switched to VPLMN X in x minutes/hours." is displayed on a screen of the terminal, where "x minutes/hours" is the timing duration of the timer, and "VPLMN X" is a VPLMN with the highest priority in the PLMN list.

The network selection module 24 is configured to: perform network selection according to the PLMN list after the current service ends when the switching rejection instruction in response to the notification information is received.

For example, it is assumed in this embodiment that "OK" and "Cancel" control buttons are configured on an interface for the notification information "You are to be switched to VPLMN X in x minutes/hours.", and if the user taps on the "Cancel" control button, it indicates that the user has entered the switching rejection instruction, the timer is set to expire, waiting for the current service to be ended is required, and the VPLMN with the highest priority is selected from the PLMN list for access after the current service ends. In this way, it is avoided that the network switching causes a task perceived by the user as high-priority to be interrupted, which affects the user experience.

The network selection module 24 is further configured to: perform network selection according to the PLMN list after the timer expires when no switching rejection instruction in response to the notification information is received.

For example, it is assumed in this embodiment that "OK" and "Cancel" control buttons are configured on an interface for the notification information "You are to be switched to VPLMN X in x minutes/hours.", and if the user taps on the "OK" control button, or because the user does not notice/ ignores the notification information, that is, the user does not tap on the "OK" or the "Cancel" control button, it is considered that no switching rejection instruction in response to the notification information is received. In this case, it indicates that the current service is not an emergency service, that is, the current service is not a high-priority task considered by the user, and after the timer expires, the VPLMN with the highest priority can be selected from the PLMN list for access.

The network selection module 24 is further configured to: perform network selection according to the PLMN list after the current service ends when the current service is an emergency service.

For example, when the current service is an emergency call service, waiting for the emergency call to be hung up is required. After the emergency call is hung up, network selection is performed according to the received PLMN list, that is, the VPLMN with the highest priority is selected from the PLMN list for access. Therefore, it is avoided that the network switching causes the terminal to be interrupted during execution of the emergency service, which affects the user experience.

Through the above solution, the UE in the connected state in the roaming place can access a VPLMN with a higher priority without affecting a high-priority service being executed, so as to ensure user experience.

Embodiment 5

An embodiment provides an electronic device, which may be represented in the form of a computing device (such as a server device), including a memory, a processor, and a computer program stored in the memory and executable on the processor, where the computer program, when executed by the processor, can implement the method for selecting a roaming network provided in Embodiment 1 or 2.

Figure 6:
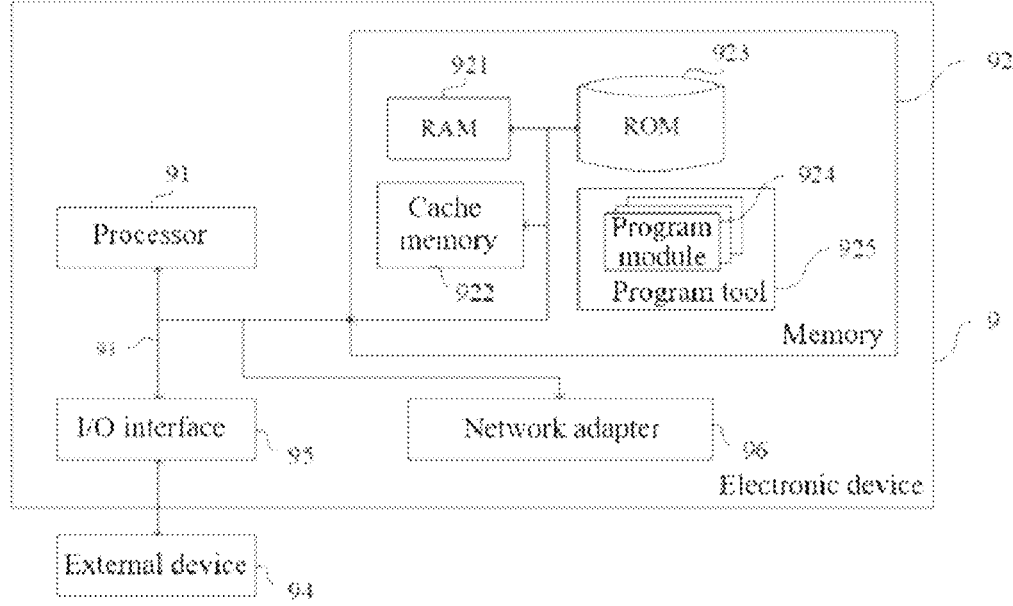
FIG. 6 is a diagram of a hardware architecture of an electronic device according to Embodiment 5 of the present disclosure.

FIG. 6 is a schematic diagram of a hardware structure of this embodiment. As shown in FIG. 6, the electronic device 9 specifically includes:

at least one processor 91, at least one memory 92, and a bus 93 configured to connect different system components (including the processor 91 and the memory 92).

The bus 93 includes a data bus, an address bus, and a control bus.

The memory 92 includes a volatile memory, for example, a random access memory (RAM) 921 and/or a cache memory 922, and may further include a read-only memory (ROM) 923.

The memory 92 further includes a program/utility tool 925 having a set of (at least one) program modules 924, such program modules 924 including but not limited to: an operating system, one or more applications, and other program modules and program data, where each of or a certain combination of these examples may include the implementation of a network environment.

The processor 91 that runs a computer program stored in the memory 92 so as to execute various functional applications and perform data processing, for example, perform the method for selecting a roaming network provided in Embodiment 1 of the present disclosure.

The electronic device 9 may further communicate with one or more external devices 94 (for example, a keyboard, a pointing device, etc.). This communication can be conducted via an input/output (I/O) interface 95. In addition, the electronic device 9 can also communicate with one or more networks (for example, a local area network (LAN), a wide area network (WAN), and/or a public network, such as the Internet) via a network adapter 96. The network adapter 96 communicates with other modules of the electronic device 9 via the bus 93. It should be understood that, although not shown in the drawing, other hardware and/or software modules may be utilized in conjunction with the electronic device 9, including but not limited to: microcodes, a device driver, a redundant processor, an external disk drive array, an RAID (disk array), a tape drive, and a data backup storage system, and the like.

It should be noted that, even though several units/modules or sub-units/sub-modules of the electronic device are mentioned in the above detailed description, such a division is exemplary and not mandatory. Actually, according to the implementations of the present application, the features and functions of two or more units/modules described above may be embodied in one unit/module. Conversely, the features and functions of one unit/module described above can be further divided into and embodied by a plurality of units/modules.

Embodiment 6

An embodiment provides a computer-readable storage medium having a computer program stored thereon, where the program, when executed by a processor, implements the steps of the method for selecting a roaming network in Embodiment 1 or 2.

More specifically, the readable storage medium may include, but are not limited to: a portable disk, a hard disk, a random access memory, a read-only memory, an erasable programmable read-only memory, an optical storage device, a magnetic storage device, or any suitable combination thereof.

In a possible implementation, the present disclosure may alternatively be implemented in the form of a program product including program codes used, when the program product is running on a terminal device, to cause the terminal device to perform the steps of the method for selecting a roaming network in Embodiment 1 or 2.

The program codes for performing the present disclosure may be written in any combination of one or more programming languages. The program codes may be entirely executed on user equipment, partially executed on the user equipment, executed as an independent software package, partially executed on the user equipment and partially executed on a remote device, or entirely executed on the remote device.

Although the specific implementations of the present disclosure are described above, it should be appreciated by those skilled in the art that these are merely illustrative and that the scope of protection of the present disclosure is defined by the appended claims. Those skilled in the art may make various changes or modifications to these implementations without departing from the principles and essence of the present disclosure, but all these changes and modifications fall within the present disclosure.

What is claimed is:

1. A method for selecting a roaming network, applicable to a terminal in a connected state in a roaming place, comprising:

receiving steering of roaming information issued by a network side device, the steering of roaming information containing a PLMN list and a timer;

determining whether the current service is an emergency service;

starting the timer when the current service is a non-emergency service, and outputting notification information, so as to notify that network switching is to be performed after the timer expires; and performing network selection according to the PLMN list after the timer expires when no switching rejection instruction in response to the notification information is received.

2. The method for selecting the roaming network as claimed in claim 1, wherein the method further comprises: performing network selection according to the PLMN list after the current service ends when the switching rejection instruction in response to the notification information is received.

3. The method for selecting the roaming network as claimed in claim 2, wherein the method further comprises: performing network selection according to the PLMN list after the current service ends when the current service is the emergency service.

4. The method for selecting the roaming network as claimed in claim 2, wherein said performing the network selection according to the PLMN list comprises:

selecting a VPLMN with a highest priority from the PLMN list.

5. The method for selecting the roaming network as claimed in claim 1, wherein the method further comprises: performing network selection according to the PLMN list after the current service ends when the current service is the emergency service.

6. The method for selecting the roaming network as claimed in claim 5, wherein said performing the network selection according to the PLMN list comprises:

selecting a VPLMN with a highest priority from the PLMN list.

7. The method for selecting the roaming network as claimed in claim 1, wherein said performing the network selection according to the PLMN list comprises:

selecting a VPLMN with a highest priority from the PLMN list.

8. An electronic device, comprising: a memory, a processor, and a computer program stored on the memory and executable on the processor, wherein the processor is configured to, receive steering of roaming information issued by a network side device, the steering of roaming information containing a PLMN list and a timer;

determine whether a current service is an emergency service;

start the timer when the current service is a non-emergency service, and outputting notification information, so as to notify that network switching is to be performed after the timer expires; and perform network selection according to the PLMN list after the timer expires when no switching rejection instruction in response to the notification information is received.

9. The electronic device as claimed in claim 8, wherein the processor is further configured to perform network selection according to the PLMN list after the current service ends when the switching rejection instruction in response to the notification information is received.

10. The electronic device as claimed in claim 9, wherein the processor is further configured to perform network selection according to the PLMN list after the current service ends when the current service is the emergency service.

11. The electronic device as claimed in claim 9, wherein the processor is specifically configured to select a VPLMN with a highest priority from the PLMN list.

12. The electronic device as claimed in claim 8, wherein the processor is further configured to perform network selection according to the PLMN list after the current service ends when the current service is the emergency service.

13. The electronic device as claimed in claim 12, wherein the processor is specifically configured to select a VPLMN with a highest priority from the PLMN list.

14. The electronic device as claimed in claim 8, wherein the processor is specifically configured to select a VPLMN with a highest priority from the PLMN list.

15. A non-transitory computer-readable storage medium having a computer program stored thereon, wherein the computer program, when executed by a processor, implements receiving steering of roaming information issued by a network side device, the steering of roaming information containing a PLMN list and a timer;

determining whether a current service is an emergency service;

starting the timer when the current service is a non-emergency service, and outputting notification information, so as to notify that network switching is to be performed after the timer expires; and performing network selection according to the PLMN list after the timer expires when no switching rejection instruction in response to the notification information is received.

16. The non-transitory computer-readable storage medium as claimed in claim 15, wherein the computer program further implements performing network selection according to the PLMN list after the current service ends when the switching rejection instruction in response to the notification information is received.

17. The non-transitory computer-readable storage medium as claimed in claim 16, wherein the computer program further implements performing network selection according to the PLMN list after the current service ends when the current service is the emergency service.

18. The non-transitory computer-readable storage medium as claimed in claim 16, wherein the computer program further implements selecting a VPLMN with a highest priority from the PLMN list.

19. The non-transitory computer-readable storage medium as claimed in claim 15, wherein the computer program further implements performing network selection according to the PLMN list after the current service ends when the current service is the emergency service.

20. The non-transitory computer-readable storage medium as claimed in claim 15, wherein the computer program further implements selecting a VPLMN with a highest priority from the PLMN list.

* * * * *